(12) United States Patent
Chen et al.

(10) Patent No.: US 12,073,564 B2
(45) Date of Patent: Aug. 27, 2024

(54) METHOD FOR AUTOMATIC SEGMENTATION OF FUZZY BOUNDARY IMAGE BASED ON ACTIVE CONTOUR AND DEEP LEARNING

(71) Applicant: SOUTH CHINA UNIVERSITY OF TECHNOLOGY, Guangzhou (CN)

(72) Inventors: Junying Chen, Guangzhou (CN); Haijun You, Guangzhou (CN)

(73) Assignee: SOUTH CHINA UNIVERSITY OF TECHNOLOGY, Guangzhou (CN)

( * ) Notice: Subject to any disclaimer, the term of this patent is extended or adjusted under 35 U.S.C. 154(b) by 391 days.

(21) Appl. No.: 17/641,445

(22) PCT Filed: Oct. 31, 2020

(86) PCT No.: PCT/CN2020/125703
§ 371 (c)(1),
(2) Date: Mar. 9, 2022

(87) PCT Pub. No.: WO2021/047684
PCT Pub. Date: Mar. 18, 2021

(65) Prior Publication Data
US 2022/0414891 A1 Dec. 29, 2022

(30) Foreign Application Priority Data
Sep. 9, 2019 (CN) .......................... 201910846367.8

(51) Int. Cl.
*G06K 9/00* (2022.01)
*A61K 35/12* (2015.01)
(Continued)

(52) U.S. Cl.
CPC ................ *G06T 7/149* (2017.01); *G06T 7/11* (2017.01); *G06T 7/12* (2017.01); *G06T 7/62* (2017.01);
(Continued)

(58) Field of Classification Search
CPC ........... G06K 9/00; A61K 35/12; G16H 50/20
(Continued)

(56) References Cited

U.S. PATENT DOCUMENTS 7,744,534 B2 * 6/2010 Chalana .............. G01S 7/52065
600/407
10,157,462 B2 * 12/2018 Bagci ..................... G06V 10/82
(Continued)

FOREIGN PATENT DOCUMENTS

| CN | 103886564 | 6/2014 |
|---|---|---|
| CN | 106056576 | 10/2016 |

(Continued)

OTHER PUBLICATIONS

"International Search Report (Form PCT/ISA/210) of PCT/CN2020/125703," mailed on Jan. 21, 2021, with English translation thereof, pp. 1-4.

*Primary Examiner* — Seyed H Azarian
(74) *Attorney, Agent, or Firm* — JCIPRNET

(57) ABSTRACT

The present invention discloses a method for automatic segmentation of a fuzzy boundary image based on active contour and deep learning. In the method, firstly, a fuzzy boundary image is segmented using a deep convolutional neural network model to obtain an initial segmentation result; then, a contour of a region inside the image segmented using the deep convolutional neural network model is used as an initialized contour and a contour constraint of an active contour model; and the active contour model drives, through image characteristics of a surrounding region of each contour point, the contour to move towards a target edge to derive an accurate segmentation line between a target region and other background regions. The present invention introduces an active contour model on the basis of a deep convolutional neural network model to further refine a segmentation result of a fuzzy boundary (Continued)

image, which has the capability of segmenting a fuzzy boundary in the image, thus further improving the accuracy of segmentation of the fuzzy boundary image.

8 Claims, 4 Drawing Sheets

(51) Int. Cl.
*G06T 7/11* (2017.01)
*G06T 7/12* (2017.01)
*G06T 7/149* (2017.01)
*G06T 7/62* (2017.01)

(52) U.S. Cl.
CPC ............... *G06T 2207/10132* (2013.01); *G06T 2207/20081* (2013.01); *G06T 2207/20084* (2013.01); *G06T 2207/20116* (2013.01); *G06T 2207/20161* (2013.01); *G06T 2207/30004* (2013.01)

(58) Field of Classification Search
USPC ....... 382/100, 103, 106, 128–134, 156, 168, 382/173, 181, 199, 219–224, 254, 382/286–293, 318; 600/407, 408
See application file for complete search history.

(56) References Cited

U.S. PATENT DOCUMENTS

| 11,147,502 | B2* | 10/2021 | Mohammadi | ........ A61B 5/7203 |
|---|---|---|---|---|
| 2008/0118136 | A1* | 5/2008 | Cai | ....................... G06V 10/755 |
| | | | | 382/131 |
| 2018/0330477 | A1* | 11/2018 | Paik | ....................... G06V 10/26 |
| 2020/0060604 | A1* | 2/2020 | Mohammadi | ........ A61B 5/6822 |
| 2022/0230310 | A1* | 7/2022 | Xie | ........................... G06T 7/70 |

FOREIGN PATENT DOCUMENTS

| CN | 106447688 | 2/2017 |
|---|---|---|
| CN | 108013904 | 5/2018 |
| CN | 110689545 | 1/2020 |

* cited by examiner

METHOD FOR AUTOMATIC SEGMENTATION OF FUZZY BOUNDARY IMAGE BASED ON ACTIVE CONTOUR AND DEEP LEARNING

TECHNICAL FIELD

The present invention relates to the technical field of fuzzy boundary image processing, and in particular to a method for automatic segmentation of a fuzzy boundary image based on active contour and deep learning.

BACKGROUND

The difficulty of fuzzy image segmentation lies in the difficulty of accurately locating complex boundaries and correctly segmenting tiny isolated targets. Complex boundaries include situations of fuzzy boundaries, boundary disappearance, complex boundary interactions, and variable shapes. Ultrasonic images are a common kind of fuzzy images, and their low contrast and noisy characteristics tend to make the target edges fuzzy or even disappear, so the actual boundaries of the target are susceptible to artifacts, or even partially obscured by a large number of artifacts. Accurate segmentation of fuzzy boundary images becomes a challenge nowadays.

In recent years, deep convolutional neural network models have achieved remarkable results in semantic segmentation and remarkable results in low-contrast image processing. Fuzzy boundaries have certain ambiguity and are prone to noise in the training stage, which makes the deep model still have the problem of insufficient fuzzy boundary segmentation capability in the application of fuzzy boundary image segmentation. Among the traditional ultrasonic image segmentation methods, the active contour model based on level sets has the advantages of being insensitive to noise, being able to evolve the contour on the fuzzy boundary of the target and keeping the contour close to the target boundary. However, the active contour model needs to initialize the contour, and is thus difficult to cope with complex images. The deep convolutional neural network model has been able to achieve better fuzzy boundary image segmentation results, and applying the active contour model on such segmentation results can effectively alleviate the limitation of the initialized contour on the active contour model, and can further improve the fuzzy boundary segmentation capability and the accuracy of boundary segmentation results after the fine tuning of local regions.

The method for automatic segmentation of a fuzzy boundary image based on active contour and deep learning proposed in the present invention, in combination with an active contour model and a deep convolutional neural network model, is able to segment a fuzzy boundary image accurately.

SUMMARY

The method for automatic segmentation of a fuzzy boundary image based on active contour and deep learning of the present invention, while realizing automatic segmentation of a fuzzy boundary image, further improves the accuracy of fuzzy boundary segmentation, thus realizing accurate segmentation of a target with fuzzy boundaries in the image Firstly, a fuzzy boundary image is segmented using a deep learning model to obtain an initialized target segmentation result; and the segmentation result of the model is then fine-tuned using an active contour model to obtain a more accurate normal boundary and fuzzy boundary segmentation result. The deep active contour model proposed in the present invention uses the method of local evolution of contour points to drive the contour to move towards a target boundary, and at the same time, uses the initialized contour to constrain over-evolution of the contour.

The purpose of the present invention is achieved by at least one of the following technical schemes.

A method for automatic segmentation of a fuzzy boundary image based on active contour and deep learning, includes the following steps:

S1, segmenting a fuzzy boundary image using a deep learning model to obtain an initialized target segmentation result; and S2, fine-tuning the segmentation result of the model using an active contour model to obtain a more accurate normal boundary and fuzzy boundary segmentation result, the step specifically comprising:

S2.1, initializing the active contour model using a region boundary in the initialized target segmentation result obtained in S1 to construct an initial level set;

S2.2, using the level set to represent an energy function, and obtaining a partial differential equation for curve evolution through the energy function;

S2.3, performing a judgment of a region in which a contour point is located; and S2.4, after determining a region in which each contour point is located, calculating a value of the partial differential equation and evolving a contour through iterations until a maximum number of iterations is reached or the contour changes slightly or does not change, and then completing the segmentation.

Further, in step S2.1, the initial level set $\phi_I(x,y)$ of the active contour model is constructed from the segmentation result of the deep learning model, and the initial level set is defined as follows:

$$\phi_I(x, y) = \begin{cases} D(x, y), & R(x, y) = 0 \\ -D(x, y), & R(x, y) = 1 \end{cases}$$

where $R(x,y)=\{0,1\}$ is the segmentation result of the deep learning model, $R(x,y)=0$ indicates that a point $(x,y)$ belongs to a target region, and $R(x,y)=1$ indicates that the point $(x,y)$ belongs to a non-target region; and points at a demarcation between the target region and the non-target region form a target boundary B, and $D(x,y)$ is the shortest distance between each point $(x,y)$ on the image and the target boundary B.

Further, in step S2.2, a total of three parts are included in the energy function: 1) the perimeter and area of the contour; 2) a contour local region energy; and 3) a contour constraint energy; and the whole energy function is defined as follows:

$$F = u \cdot \text{Length}(C) + v \cdot \text{Area}(\text{inside}(C)) +$$

$$\lambda_1 \left( \sum_{p \in N(C)} \int_{ia(p)} |\mu_0(x, y) - c_{ip}|^2 dxdy + \sum_{p \in B(C)} \int_{ia(p)} |\mu_0(x, y) - c_{ip} + c_1| dxdy \right) +$$

$$\lambda_2 \left( \sum_{p \in N(C)} \int_{oa(p)} |\mu_0(x, y) - c_{op}|^2 dxdy + \sum_{p \in F(C)} \int_{oa(p)} |\mu_0(x, y) - c_{op} + c_2| dxdy \right) + \frac{\lambda_3}{2}(C - C_0)^2$$

where C denotes a current segmentation contour, $C_0$ denotes an initialized segmentation contour, Length (C) denotes the perimeter of the contour C, Area(inside(C)) denotes the area of a region inside the contour C, $\mu_0(x,y)$ is a pixel intensity of a source image I at (x,y), $c_1$ is a pixel intensity average inside the contour C, $c_2$ is a pixel intensity average outside the contour C, p is a point on the contour C, p∈N(C) indicates that the contour point p is in a target edge region, p∈F(C) indicates that the contour point p is in a foreground (target) region, p∈B(C) indicates that the contour point p is in a background region, ia(p) is a point that is in the surrounding of the contour point p and inside the contour C, oa(p) is a point that is in the surrounding of the contour point p and outside the contour C, $c_{ip}$ is a pixel intensity average of points that satisfy ia(p), $c_*$ is a pixel intensity average of points that satisfy oa(p), the surrounding of the contour point p refers to being in the range of a circle with P as the center and R as the radius; and a first term and a second term in the energy function denote the perimeter and area of the contour and serve to keep the contour continuous and smooth and are related only to the size and shape of the contour itself; a third term and a fourth term in the energy function denote a contour local region energy and serve to cause the contour to evolve towards a target boundary and is related to image data; and a fifth term in the energy function denotes a contour constraint energy and serves to limit the evolution of a current contour towards a region that greatly deviates from the initialized contour, and u, v, $\lambda_1$, $\lambda_2$, $\lambda_3$ are coefficients of the corresponding energy terms.

Further, in the energy function F, a level set method is used to denote the contour C as well as the inside and outside of the contour; and in the level set method, the contour C in an image domain Ω is denoted as a zero level set, i.e., $\phi=0$, which is defined as follows:

$$\begin{cases} C = \{(x, y) \in \Omega : \phi(x, y) = 0\} \\ \text{inside}(C) = \{(x, y) \in \Omega : \phi(x, y) > 0\} \\ \text{outside}(C) = \{(x, y) \in \Omega : \phi(x, y) < 0\} \end{cases}$$

the zero level set, i.e., $\phi=0$, is used to denote the contour C;

a Heaviside function H and a Dirac function $\delta_0$ are defined as follows:

$$H(z) = \begin{cases} 1, & \text{if } z \geq 0 \\ 0, & \text{if } z < 0 \end{cases}, \quad \delta_0(z) = \frac{d}{dz} H(z);$$

H is used to denote the inside and outside of the contour C:

$$\begin{cases} \text{inside}(C) = H(\phi(x, y)) = 1 \\ \text{outside}(C) = H(\phi(x, y)) = 0 \end{cases};$$

the level set $\phi$, the function 11, and the function $\delta_0$ are used to denote the perimeter and area of the contour:

$$\text{Length}\{\phi = 0\} = \int_\Omega |\nabla H(\phi(x, y))| dx dy = \int_\Omega \delta_0(\phi(x, y))|\nabla \phi(x, y)| dx dy; \text{ and}$$

$$\text{Area}\{\phi > 0\} = \int_\Omega H(\phi(x, y)) dx dy;$$

the contour constraint energy is the difference between the current contour C and the initialized contour $C_0$ and is denoted using the level set $\phi$, the function H, and $\phi_1$, and the contour constraint energy is denoted as the difference between the current level set $\phi$ and the initialized level set $\phi_1$:

$$(C-C_0)^2 = \int_\Omega (H(\phi(x,y))) - H(\phi_1(x,y)))^2 dx dy;$$

the contour local region energy is the sum of energies inside and outside the surrounding of all contour points; an energy of surrounding regions of the contour is calculated by calculating, separately for each contour point, energies inside and outside the contour in a local region of the contour point using a local calculation method and then superimposing the energies to obtain an overall energy; and after being denoted using the level set $\phi$ and the function H, terms in the energy of the surrounding regions of the contour are defined as follows:

$$\sum_{p \in N(C)} \int_{ia(p)} |\mu_0(x, y) - c_{ip}|^2 dx dy =$$

$$\sum_{p \in N(C)} \int_{a(p)} |\mu_0(x, y) - c_{ip}|^2 H(\phi(x, y)) dx dy;$$

$$\sum_{p \in B(C)} \int_{ia(p)} |\mu_0(x, y) - c_{ip} + c_1| dx dy =$$

$$\sum_{p \in B(C)} \int_{a(p)} |\mu_0(x, y) - c_{ip} + c_1| H(\phi(x, y)) dx dy;$$

$$\sum_{p \in N(C)} \int_{oa(p)} |\mu_0(x, y) - c_{op}|^2 dx dy =$$

$$\sum_{p \in N(C)} \int_{a(p)} |\mu_0(x, y) - c_{op}|^2 (1 - H(\phi(x, y))) dx dy; \text{ and}$$

$$\sum_{p \in F(C)} \int_{oa(p)} |\mu_0(x, y) - c_{op} + c_2| dx dy =$$

$$\sum_{p \in F(C)} \int_{a(p)} |\mu_0(x, y) - c_{op} + c_2| (1 - H(\phi(x, y))) dx dy$$

where for a point $p(x_p, y_p)$ on the contour point C, $\phi(p)=0$; a(p) indicates a point that is in the surrounding of the contour point p, the surrounding of the contour point p referring to being in the range of a circle with P as the center and R as the radius; ia(p) denotes a point that is in the surrounding of the contour point p and inside the contour C and for a point $a(x_a, y_a)$ satisfying ia(p), $\phi(x_a, y_a) > 0$ and $\sqrt{(x_a-x_p)^2+(y_a-y_p)^2} \leq R$; and oa(p) denotes a point that is in the surrounding of the contour point p and outside the contour C, and for a point $a(x_a, y_a)$ satisfying oa(p), $\phi(x_a, y_a) < 0$ and $\sqrt{(x_a-x_p)^2+(y_a-y_p)^2} \leq R$.

Further, after denoting the energy terms using the level set method, the energy function F is defined as:

$$F = \mu \int_\Omega \delta_0(\phi(x, y))|\nabla \phi(x, y)| dx dy +$$

$$v \int_\Omega H(\phi(x, y)) dx dy + \lambda_1 \left( \sum_{p \in N(C)} \int_{a(p)} |\mu_0(x, y) - c_{ip}|^2 H(\phi(x, y)) dx dy + \right.$$

-continued $$\sum_{p \in B(C)} \int_{a(p)} |\mu_0(x, y) - c_{ip} + c_1| H(\phi(x, y)) dx dy \Big) +$$

$$\lambda_2 \Bigg( \sum_{p \in N(C)} \int_{a(p)} |\mu_0(x, y) - c_{op}|^2 (1 - H(\phi(x, y))) dx dy +$$

$$\sum_{p \in F(C)} \int_{a(p)} |\mu_0(x, y) - c_{op} + c_2| (1 - H(\phi(x, y))) dx dy \Bigg) +$$

$$\frac{\lambda_3}{2} \int_{\Omega} (H(\phi(x, y))) - H(\phi_I(x, y))^2 dx dy$$

where $c_1$ is the pixel intensity average inside the contour C, and $c_2$ is the pixel intensity average outside the contour C, which satisfy, respectively: $c_1(\phi)$=average $(u_0)$ in $\{\phi \geq 0\}$, $c_2(\phi)$=average $(u_0)$ in $\{\phi < 0\}$; and $c_1$ and $c_2$ are defined through the level set $\phi$ as follows:

$$c_1 = \frac{\int_{\Omega} u_0(x, y) H(\phi(x, y)) dx dy}{\int_{\Omega} H(\phi(x, y)) dx dy}; \text{ and}$$

$$c_2 = \frac{\int_{\Omega} u_0(x, y)(1 - H(\phi(x, y))) dx dy}{\int_{\Omega} (1 - H(\phi(x, y))) dx dy}$$

where $c_{ip}$ is a pixel intensity average of points satisfying ia(p) and $c_{op}$ is a pixel intensity average of points satisfying oa(p); and $c_{ip}(\varphi)$=average$(\mu_0)$ in $\{a(p)$ and $\varphi \geq 0\}$ and $c_{op}(\varphi)$=average$(\mu_0)$ in $\{a(p)$ and $\varphi < 0\}$ are defined as follows:

$$c_{ip} = \frac{\int_{a(p)} u_0(x, y) H(\phi(x, y)) dx dy}{\int_{a(p)} H(\phi(x, y)) dx dy}; \text{ and}$$

$$c_{op} = \frac{\int_{a(p)} u_0(x, y)(1 - H(\phi(x, y))) dx dy}{\int_{a(p)} (1 - H(\phi(x, y))) dx dy};$$

and a partial differential equation for curve evolution is obtained from the energy function F by means of a Euler-Lagrange variational method and a gradient descent flow as follows:

$$\frac{\partial \phi}{\partial t} = \delta_s \Bigg[ u div\Big(\frac{\nabla \phi}{|\nabla \phi|}\Big) - v -$$

$$\lambda_1 \Bigg( \sum_{p \in N(C),(x,y) \in a(p)} (u_0(x, y) - c_{ip})^2 - \sum_{p \in B(C),(x,y) \in a(p)} (u_0(x, y) - c_{ip} + c_1)^2 \Bigg) +$$

$$\lambda_2 \Bigg( \sum_{p \in N(C),(x,y) \in a(p)} (u_0(x, y) - c_{ip})^2 - \sum_{p \in F(C),(x,y) \in a(p)} (u_0(x, y) - c_{ip} + c_2)^2 \Bigg) +$$

$$\lambda_3 (H_\varepsilon(\phi) - H_\varepsilon(\phi_I)) \Bigg]$$

where $$H_\varepsilon(z) = \frac{1}{2}\Big(1 + \frac{2}{\pi} \arctan\Big(\frac{z}{\varepsilon}\Big)\Big), \delta_\varepsilon(z) = \frac{\varepsilon}{\pi(\varepsilon^2 + z^2)},$$

and $(x,y) \in a(p)$ indicates that the point $(x\ y)$ is in the surrounding of the contour point p, the surrounding of the contour point p referring to being in the range of a circle with P as the center and R as the radius; and in the process of curve evolution, the level set of the nth iteration is $\phi^n$ and the level set of the (n+1)th iteration is $$\phi^{n+1} = \phi^n + \Delta t \frac{\partial \phi}{\partial t},$$

and partial derivatives in the horizontal direction and the vertical direction of a two-dimensional image are calculated using a finite difference approach.

Further, in step S2.3, it is judged whether the contour point p is in a target edge region or a non-target edge region by the difference between pixel intensities inside and outside the contour, and the specific method is as follows: in the fuzzy boundary image, the difference between the pixel intensity averages inside and outside the surrounding of the contour is larger in the target edge region, while the difference between the pixel intensity averages inside and outside the surrounding of the contour is smaller in the non-target edge region; and when the contour point P is in the non-target edge region, the values of $c_{ip}$ and $c_{op}$ are close to each other, i.e., $c_{ip} \approx c_{op}$, $|c_{ip} - c_{op}| \leq c_d$, $c_d$ being a threshold for judging whether $c_{ip}$ is close to $c_{op}$ and the judgment is performed through the following steps:

S2.3.1, calculating the difference $d_p$ between $c_{ip}$ and $c_{op}$ for each contour point on the contour in counterclockwise order, and constructing a closed-loop queue D in an order obtained through $d_p$;

S2.3.2, smoothing the closed-loop queue D using a Gaussian filter of width R;

S2.3.3, searching for a fragment $\Delta C$ that is longer than 2R and satisfies $d_p \leq c_d$ in the closed-loop queue D; and S2.3.4, if there exists a fragment satisfying step S2.3.3, all contour points in the fragment are in the non-target edge region and the other contour points are in the target edge region; and the sum of energies inside the contour in local regions of contour points in the target edge region is as follows:

$$\sum_{p \in N(C)} \int_{a(p)} |\mu_0(x, y) - c_{ip}|^2 H(\phi(x, y)) dx dy;$$

and the sum of energies outside the contour in local regions of contour points in the target edge region is as follows:

$$\sum_{p \in N(C)} \int_{a(p)} |\mu_0(x, y) - c_{op}|^2 (1 - H(\phi(x, y))) dx dy.$$

Further, in response to the contour point p being in the non-target edge region, it is further determined whether the contour point p is in a foreground region or a background region; and since the characteristics of a surrounding region of a contour point are similar to those of a region in which the contour point is located, the fuzzy boundary image is divided into several subregions according to image characteristics, and then, for these subregions, it is determined whether the contour point p is in the foreground region or the background region, and the specific method is as follows:

S2.3.5, firstly, dividing the fuzzy boundary image into several subregions according to image characteristics, and determining a subregion O in which the contour fragment ΔC is located;

S2.3.6, establishing a two-dimensional coordinate system in the image subregion O with the coordinate position of a contour point in the middle of the contour fragment ΔC as the center point center $(x_0, y_0)$ of a two-dimensional Gaussian function $f(x,y)$, with ⅙ of the maximum distance of $x_0$ from a boundary of the subregion as the standard deviation $\sigma_x$ of the X-axis portion of the Gaussian function, and with ⅙ of the maximum distance of $y_0$ from the boundary of the subregion as the standard deviation $\sigma_y$ of the Y-axis portion of the Gaussian function; and assigning a weight $w_{ij}$ to each point in the subregion using the two-dimensional Gaussian function and normalizing weights $w_{ij}$ for the inside and outside of the contour, respectively, to obtain normalized weights $w_{ij\_in}$ for the inside of the contour and normalized weights $w_{ij\_out}$ for the outside of the contour;

S2.3.7, calculating averages $c_{o1}$ and $c_{o2}$ for the inside and outside of the contour in the subregion O using the normalized weights $w_{ij\_in}$ and $w_{ij\_out}$ and a pixel intensity $\mu_0(i,j)$, wherein when the point (i,j) is inside the contour in the subregion O $$c_{o1} = \frac{\sum w_{ij\_in} \cdot \mu_0(i,j)}{N},$$

N being the number of points inside the contour in the subregion O; and when the point (i,j) is outside the contour in the subregion O, $$c_{o2} = \frac{\sum w_{ij\_out} \cdot \mu_0(i,j)}{M},$$

M being the number of points outside the contour in the subregion O; and

S2.3.8, calculating a pixel intensity average $m_{\Delta c}$ of surrounding regions of all contour points in the contour fragment ΔC, and comparing the differences between $m_{\Delta c}$ and $c_{o1}$ and $c_{o2}$, wherein if $|m_{\Delta c} - c_{o1}| \leq |m_{\Delta c} - c_{o2}|$, the contour points in the contour fragment ΔC are in the foreground region, and otherwise in the background region.

Further, if the contour point p is in the foreground region, the direction of evolution of the contour point p is towards the outside of the contour, wherein in the energy function, the correction of the direction of evolution is embodied in increasing the energy of the outside of the contour in a local region of the foreground contour point, with the increased energy being defined as:

$$\sum_{p \in F(C)} \int_{a(p)} |\mu_0(x,y) - c_{op} + c_2|(1 - H(\phi(x,y))) dxdy;$$

if the contour point p is in the background region, the direction of evolution of the contour point p is towards the inside of the contour, wherein in the energy function, the correction of the direction of evolution is embodied in increasing the energy of the inside of the contour in a local region of the background contour point, with the increased energy being defined as:

$$\sum_{p \in B(C)} \int_{a(p)} |\mu_0(x,y) - c_{ip} + c_1| H(\phi(x,y)) dxdy.$$

Further, in step S2.4 the contour is evolved through iterations of $$\phi^{n+1} = \phi^n + \Delta t \frac{\partial \phi}{\partial t}$$

until a maximum number of iterations iter is reached or the contour changes slightly or does not change, where 200≤iter≤10000; and a contour change $$\Delta h = \sum_{i,j} (|H(\phi_{i,j}^{n+1}) - H(\phi_{i,j}^n)|),$$

which indicates changing of the contour, and the iteration stops in response to a plurality of successive slight changes of the contour.

Compared with the prior art, the present invention has the advantages:

The present invention applies an active contour model to the field of fuzzy boundary image segmentation, and further optimizes the segmentation result of a deep convolutional neural network model. During construction of the energy function, firstly, the energy associated with image pixels is obtained by superposing and calculating the characteristics of a surrounding region of each contour point, and at the same time, the judgment of a region in which the contour point is located and the correction of the direction of evolution of the contour point are introduced, thus causing this method to be capable of segmenting fuzzy boundaries and improving the accuracy of boundary segmentation.

DETAILED DESCRIPTION

The specific implementation of the present invention will be further described with reference to the drawings and embodiments below, which, however, should not be construed as a limitation on the implementation and scope of protection of the present invention. It should be noted that details which are not set forth below can be implemented by those skilled in the art with reference to the prior art.

Embodiment

Figure 1:
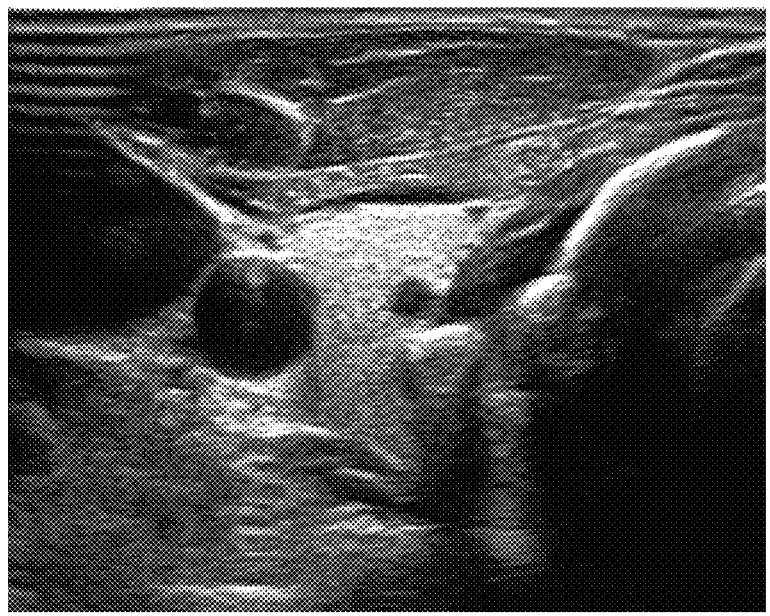
FIG. 1 illustrates a thyroid ultrasonic image, which is an original fuzzy boundary image, in an embodiment of the present invention.
Figure 8:
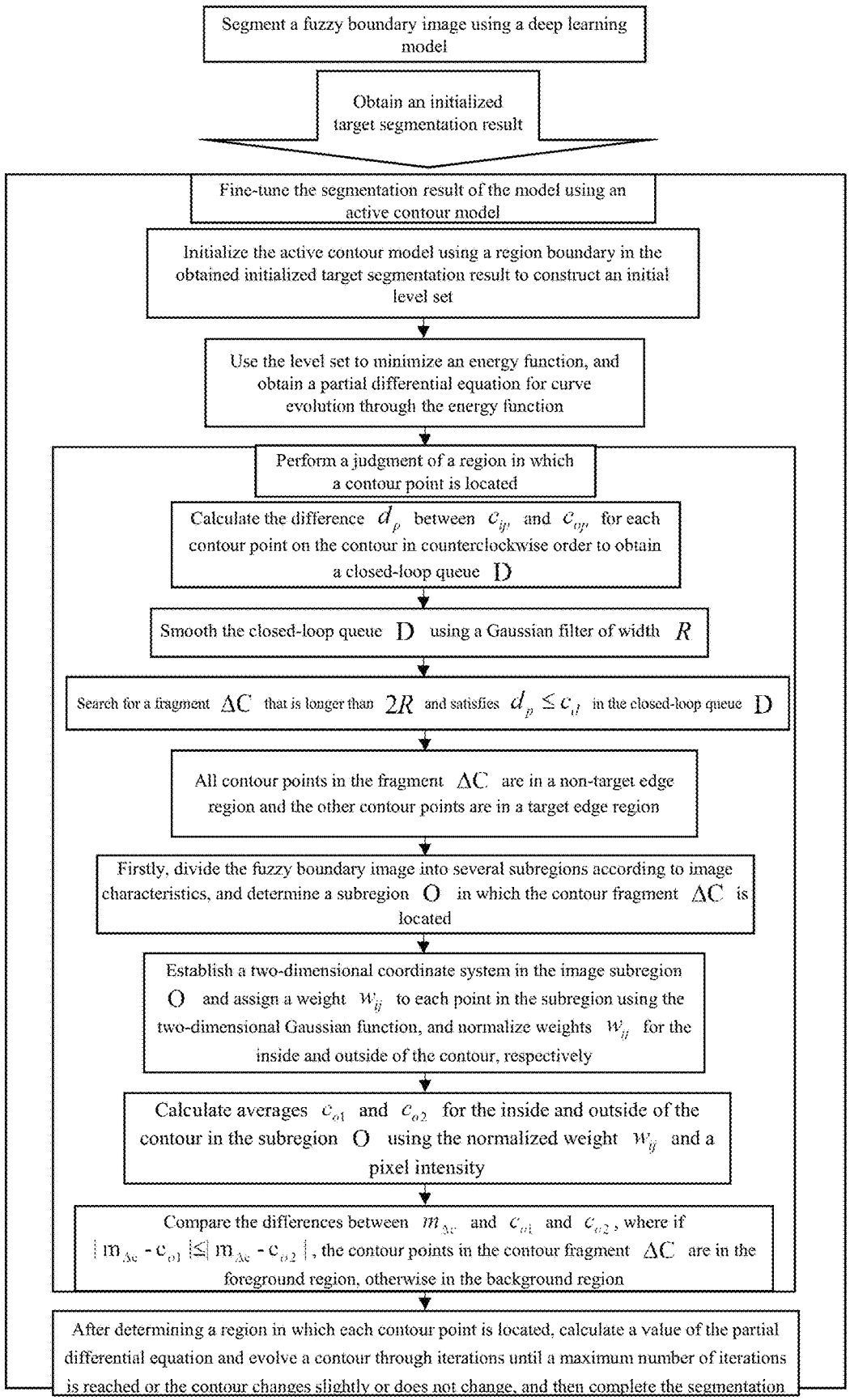
FIG. 8 illustrates a flowchart of steps of the embodiment of the present invention.

A method for automatic segmentation of a fuzzy boundary image based on active contour and deep learning, as shown in FIG. 8, includes the following steps:

In S1, for a fuzzy boundary image, such as a thyroid ultrasonic image shown in FIG. 1, a thyroid region is segmented using a trained U-Net convolutional neural network model to obtain a U-Net segmentation result image.

Figure 3:
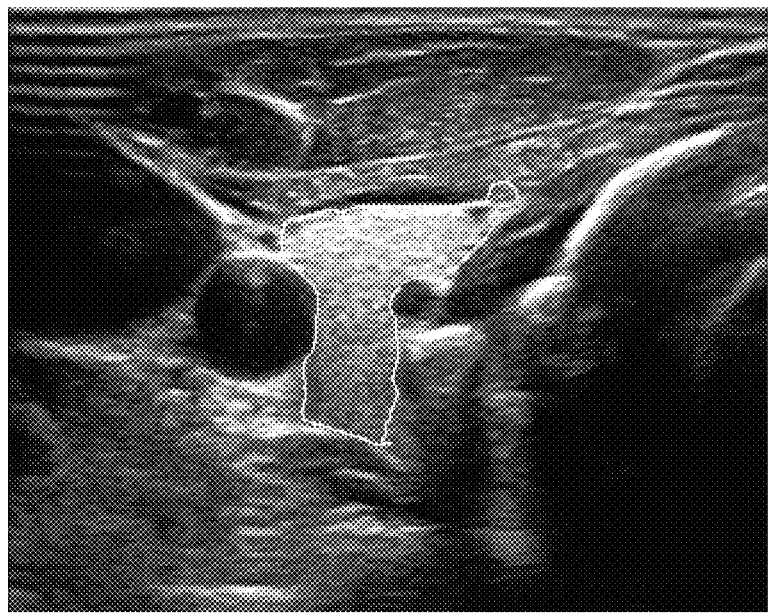
FIG. 3 illustrates a schematic diagram of the result of segmenting the thyroid region based on a U-Net deep convolutional neural network in the embodiment of the present invention.

In S2, the segmentation result of the model is fine-tuned using an active contour model to obtain a more accurate normal boundary and fuzzy boundary segmentation result, as shown in FIG. 8, the step specifically including the following steps:

In S2.1, the active contour model is initialized using a boundary of the thyroid region in FIG. 3 to construct an initial level set $\phi_1(x,y)$; parameters of the active contour model are set as follows: $\mu=1, v=0, \lambda_1=1, \lambda_2=1, \lambda_3=1, \Delta t=0.1, R=8, c_d=8, \varepsilon=1$; and the initial level set is defined as follows:

$$\phi_I(x, y) = \begin{cases} D(x, y), & R(x, y) = 0 \\ -D(x, y), & R(x, y) = 1 \end{cases}$$

where $R(x,y)=\{0,1\}$ is the segmentation result of the deep learning model, $R(x,y)=0$ indicates that a point $(x,y)$ belongs to a target region, and $R(x,y)=1$ indicates that the point $(x,y)$ belongs to a non-target region; and points at a demarcation between the target region and the non-target region form a target boundary B, and $D(x,y)$ is the shortest distance between each point $(x,y)$ on the image and the target boundary B.

In S2.2, the level set is used to represent an energy function, and a partial differential equation for curve evolution is obtained through the energy function, where a total of three parts are included in the energy function: 1) the perimeter and area of the contour; 2) a contour local region energy; and 3) a contour constraint energy; and the whole energy function is defined as follows:

$$F = u \cdot \text{Length}(C) + v \cdot \text{Area (inside } (C)) + \lambda_1 \left( \sum_{p \in N(C)} \int_{ia(p)} |\mu_0(x, y) - c_{ip}|^2 dxdy + \sum_{p \in B(C)} \int_{ia(p)} |\mu_0(x, y) - c_{ip} + c_1| dxdy \right) + \lambda_2 \left( \sum_{p \in N(C)} \int_{oa(p)} |\mu_0(x, y) - c_{op}|^2 dxdy + \sum_{p \in F(C)} \int_{oa(p)} |\mu_0(x, y) - c_{op} + c_2| dxdy \right) + \frac{\lambda_3}{2}(C - C_0)^2$$

where C denotes a current segmentation contour, $C_0$ denotes an initialized segmentation contour, Length (C) denotes the perimeter of the contour C, Area(inside(C)) denotes the area of a region inside the contour C, $\mu_0(x,y)$ is a pixel intensity of a source image I at $(x,y)$, $c_1$ is a pixel intensity average inside the contour C, $c_2$ is a pixel intensity average outside the contour C, p is a point on the contour C, $p \in N(C)$ indicates that the contour point p is in a target edge region, $p \in F(C)$ indicates that the contour point p is in a foreground (target) region, $p \in B(C)$ indicates that the contour point p is in a background region, ia(p) is a point that is in the surrounding of the contour point p and inside the contour C, oa(p) is a point that is in the surrounding of the contour point p and outside the contour C, $c_{ip}$ is a pixel intensity average of points that satisfy ia(p), $c_{op}$ is a pixel intensity average of points that satisfy oa(p), the surrounding of the contour point p refers to being in the range of a circle with P as the center and R as the radius; and a first term and a second term in the energy function denote the perimeter and area of the contour and serve to keep the contour continuous and smooth and are related only to the size and shape of the contour itself; a third term and a fourth term in the energy function denote a contour local region energy and serve to cause the contour to evolve towards a target boundary and is related to image data; and a fifth term in the energy function denotes a contour constraint energy and serves to limit the evolution of a current contour towards a region that greatly deviates from the initialized contour, and u, v, $\lambda_1, \lambda_2, \lambda_3$ are coefficients of the corresponding energy terms.

Further, in the energy function F, a level set method is used to denote the contour C as well as the inside and outside of the contour; and in the level set method, the contour C in an image domain $\Omega$ is denoted as a zero level set, i.e., $\phi=0$, which is defined as follows:

$$\begin{cases} C = \{(x, y) \in \Omega : \phi(x, y) = 0\} \\ \text{inside}(C) = \{(x, y) \in \Omega : \phi(x, y) > 0\} \\ \text{outside}(C) = \{(x, y) \in \Omega : \phi(x, y) > 0\} \end{cases}$$

the zero level set, i.e., $\phi=0$, is used to denote the contour C;

a Heaviside function H and a Dirac function $\delta_0$ are defined as follows:

$$H(z) = \begin{cases} 1, & \text{if } z \geq 0 \\ 0, & \text{if } z < 0 \end{cases}, \delta_0(z) = \frac{d}{dz}H(z);$$

H is used to denote the inside and outside of the contour C $$\begin{cases} \text{inside } (C) = H(\phi(x, y)) = 1 \\ \text{outside } (C) = H(\phi(x, y)) = 0 \end{cases};$$

the level set $\phi$, the function H and the function $\delta_0$ are used to denote the perimeter and area of the contour:

$$\text{Length } \{\phi = 0\} = \int_\Omega |\nabla H(\phi(x, y))| dx dy = \int_\Omega \delta_0(\phi(x, y))|\nabla \phi(x, y)| dx dy; \text{ and}$$

$$\text{Area } \{\phi > 0\} = \int_\Omega H(\phi(x, y)) dx dy;$$

the contour constraint energy is the difference between the current contour C and the initialized contour $C_0$, and is denoted using the level set $\phi$, the function H, and $\phi_1$, and the contour constraint energy is denoted as the difference between the current level set $\phi$ and the initialized level set $\phi_1$:

$(C-C_0)^2 = \int_\Omega (H(\phi(x,y))-H(\phi_1(x,y))^2 dx dy;$ the contour local region energy is the sum of energies inside and outside the surrounding of all contour points; an energy of surrounding regions of the contour is calculated by calculating, separately for each contour point, energies inside and outside the contour in a local region of the contour point using a local calculation method and then superimposing the energies to obtain an overall energy; and after being denoted using the level set $\phi$ and the function H, terms in the energy of the surrounding regions of the contour are defined as follows:

$$\sum_{p \in N(C)} \int_{ia(p)} |\mu_0(x, y) - c_{ip}|^2 dx dy =$$

$$\sum_{p \in N(C)} \int_{a(p)} |\mu_0(x, y) - c_{ip}|^2 H(\phi(x, y)) dx dy;$$

$$\sum_{p \in B(C)} \int_{ia(p)} |\mu_0(x, y) - c_{ip} + c_1| dx dy =$$

$$\sum_{p \in B(C)} \int_{a(p)} |\mu_0(x, y) - c_{ip} + c_1| H(\phi(x, y)) dx dy;$$

$$\sum_{p \in N(C)} \int_{oa(p)} |\mu_0(x, y) - c_{op}|^2 dx dy =$$

$$\sum_{p \in N(C)} \int_{a(p)} |\mu_0(x, y) - c_{op}|^2 (1 - H(\phi(x, y))) dx dy; \text{ and}$$

$$\sum_{p \in F(C)} \int_{oa(p)} |\mu_0(x, y) - c_{op} + c_2| dx dy =$$

$$\sum_{p \in F(C)} \int_{oa(p)} |\mu_0(x, y) - c_{op} + c_2|(1 - H(\phi(x, y))) dx dy$$

where for a point $p(x_p, y_p)$ on the contour point C, $\phi(p)=0$ a(p) indicates a point that is in the surrounding of the contour point p, the surrounding of the contour point p referring to being in the range of a circle with P as the center and R as the radius; ia(p) denotes a point that is in the surrounding of the contour point p and inside the contour C and for a point $a(x_a, y_a)$ satisfying ia(p), $\phi(x_a, y_a) > 0$ and $\sqrt{(x_a-x_p)^2+(y_a-y_p)^2} \leq R$, and oa(p) denotes a point that is in the surrounding of the contour point p and outside the contour C and for a point $a(x_a, y_a)$ satisfying oa(p), $\phi(x_a, y_a) \leq 0$ and $\sqrt{(x_a-x_p)^2+(y_a-y_p)^2} \leq R$.

Further, after denoting the energy terms using the level set method, the energy function F is defined as:

$$F = \mu \int_\Omega \delta_0(\phi(x, y))|\nabla \phi(x, y)| dx dy +$$

$$v \int_\Omega H(\phi(x, y)) dx dy + \lambda_1 \left( \sum_{p \in N(C)} \int_{a(p)} |\mu_0(x, y) - c_{ip}|^2 H(\phi(x, y)) dx dy + \right.$$

$$\left. \sum_{p \in B(C)} \int_{a(p)} |\mu_0(x, y) - c_{ip} + c_1| H(\phi(x, y)) dx dy \right) +$$

$$\lambda_2 \left( \sum_{p \in N(C)} \int_{a(p)} |\mu_0(x, y) - c_{op}|^2 (1 - H(\phi(x, y))) dx dy + \right.$$

$$\left. \sum_{p \in F(C)} \int_{oa(p)} |\mu_0(x, y) - c_{op} + c_2|(1 - H(\phi(x, y))) dx dy \right) +$$

$$\frac{\lambda_3}{2} \int_\Omega (H(\phi(x, y))) - H(\phi_I(x, y))^2 dx dy$$

where $c_1$ is the pixel intensity average inside the contour C, and $c_2$ is the pixel intensity average outside the contour C, which satisfy, respectively: $c_1(\phi)$=average $(\mu_0)$ in $\{\phi \geq 0\}$, $c_2(\phi)$=average $(\mu_0)$ in $\{\phi < 0\}$ and $c_1$ and $c_2$ are defined through the level set $\phi$ as follows:

$$c_1 = \frac{\int_\Omega u_0(x, y) H(\phi(x, y)) dx dy}{\int_\Omega H(\phi(x, y)) dx dy}; \text{ and}$$

$$c_2 = \frac{\int_\Omega u_0(x, y)(1 - H(\phi(x, y))) dx dy}{\int_\Omega (1 - H(\phi(x, y))) dx dy}$$

where $c_{ip}$ is a pixel intensity average of points satisfying ia(p) and $c_{op}$ is a pixel intensity average of points satisfying oa(p); and $c_{ip}$ average($\mu_0$) in $\{a(p)$ and $\varphi \geq 0\}$ and $c_{op}(\varphi)$=average($\mu_0$) in $\{a(p)$ and $\varphi < 0\}$ are defined as follows:

$$c_{ip} = \frac{\int_{a(p)} u_0(x, y) H(\phi(x, y)) dx dy}{\int_{a(p)} H(\phi(x, y)) dx dy}; \text{ and}$$

$$c_{op} = \frac{\int_{a(p)} u_0(x, y)(1 - H(\phi(x, y))) dx dy}{\int_{a(p)} (1 - H(\phi(x, y))) dx dy};$$

a partial differential equation for curve evolution is obtained from the energy function F by means of a Euler-Lagrange variational method and a gradient descent flow as follows:

$$\frac{\partial \phi}{\partial t} = \delta_\varepsilon \left[ udiv\left(\frac{\nabla \phi}{|\nabla \phi|}\right) - v - \right.$$

$$\lambda_1 \left( \sum_{p \in N(C), (x,y) \in a(p)} (u_0(x,y) - c_{ip})^2 - \sum_{p \in B(C), (x,y) \in a(p)} (u_0(x,y) - c_{ip} + c_1)^2 \right) +$$

$$\lambda_2 \left( \sum_{p \in N(C), (x,y) \in a(p)} (u_0(x,y) - c_{ip})^2 - \sum_{p \in F(C), (x,y) \in a(p)} (u_0(x,y) - c_{ip} + c_2)^2 \right) +$$

$$\left. \lambda_3 (H_\varepsilon(\phi) - H_\varepsilon(\phi_I)) \right]$$

where $$H_\varepsilon(z) = \frac{1}{2}\left(1 + \frac{2}{\pi}\arctan\left(\frac{z}{\varepsilon}\right)\right), \quad \delta_\varepsilon(z) = \frac{\varepsilon}{\pi(\varepsilon^2 + z^2)},$$

and $(x,y) \in a(p)$ indicates that the point $(x,y)$ is in the surrounding of the contour point p, the surrounding of the contour point p referring to being in the range of a circle with P as the center and R as the radius; and in the process of curve evolution, the level set of the nth iteration is $\phi^n$ and the level set of the (n+1)th iteration is $$\phi^{n+1} = \phi^n + \Delta t \frac{\partial \phi}{\partial t},$$

and partial derivatives in the horizontal direction and the vertical direction of a two-dimensional image are calculated using a finite difference approach.

Figure 5:
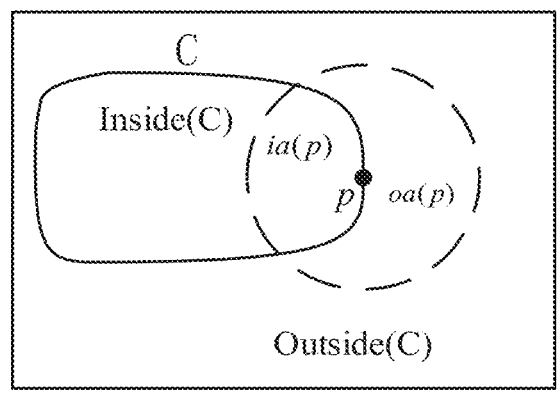
FIG. 5 illustrates a schematic diagram of a local region of a contour point p in the embodiment of the present invention.

In S2.3, a judgment of a region in which a contour point is located is performed. As shown in FIG. 5, the black line block denotes an image region, the closed black curve is the contour C, the region inside the contour C is denoted as Inside (C), the region outside of the contour C is denoted as Outside (C), a point p is a point on the contour C, ia(p) is a region in the surrounding of the contour point p and inside the contour C, oa(p) is a region in the surrounding of the contour point p and outside the contour C, and the surrounding of the contour point p refers to being in the range of a circle with P as the center and R as the radius, such as the circle drawn by the black dashed line in the figure.

It is judged whether the contour point p is in a target edge region or a non-target edge region by the difference between pixel intensities inside and outside the contour, and the specific method is as follows: in the fuzzy boundary image, the difference between the pixel intensity averages inside and outside the surrounding of the contour is larger in the target edge region, while the difference between the pixel intensity averages inside and outside the surrounding of the contour is smaller in the non-target edge region; and when the contour point p is in the non-target edge region, the values of $c_{ip}$ and $c_{op}$, are close to each other, i.e., $c_{ip} \sim c_{op}$, $|c_{ip} - c_{op}| \leq c_d$, $c_d$ being a threshold for judging whether $c_{ip}$ is close to $c_{op}$, and as shown in FIG. 8, the judgment is performed through the following steps:

in S2.3.1, the difference $d_p$ between $c_{ip}$, and $c_{op}$ for each contour point on the contour is calculated in counter-clockwise order, and a closed-loop queue D is constructed in an order obtained through $d_p$;

in S2.3.2, the closed-loop queue D is smoothed using a Gaussian filter of width R;

in S2.3.3, a fragment $\Delta C$ that is longer than 2R and satisfies $d_p \leq c_d$ is searched for in the closed-loop queue D; and in S2.3.4, if there exists a fragment satisfying step S2.3.3, all contour points in the fragment are in the non-target edge region and the other contour points are in the target edge region; and the sum of energies inside the contour in local regions of contour points in the target edge region is as follows:

$$\sum_{p \in N(C)} \int_{a(p)} |\mu_0(x,y) - c_{ip}|^2 H(\phi(x,y)) dx dy;$$

the sum of energies outside the contour in local regions of contour points in the target edge region is as follows:

$$\sum_{p \in N(C)} \int_{a(p)} |\mu_0(x,y) - c_{op}|^2 (1 - H(\phi(x,y))) dx dy.$$

Figure 6:
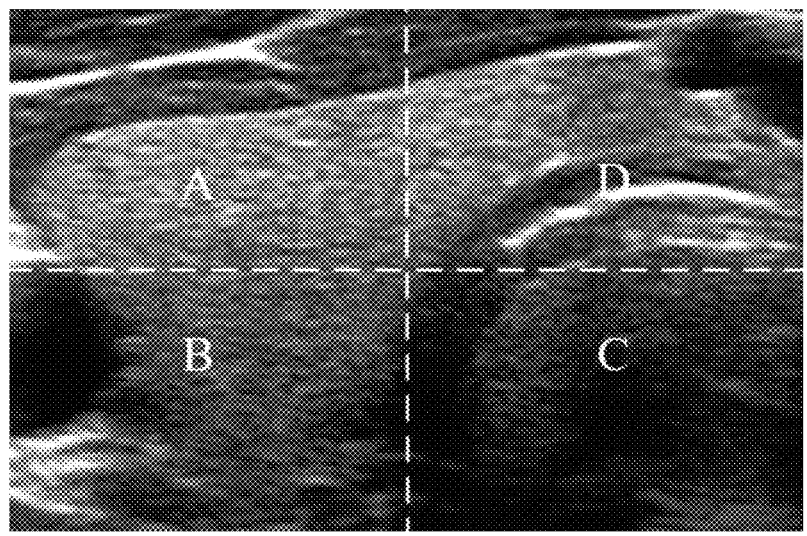
FIG. 6 illustrates a schematic diagram of a thyroid ultrasonic transverse scanned image and the division of subregions in the embodiment of the present invention.
Figure 7:
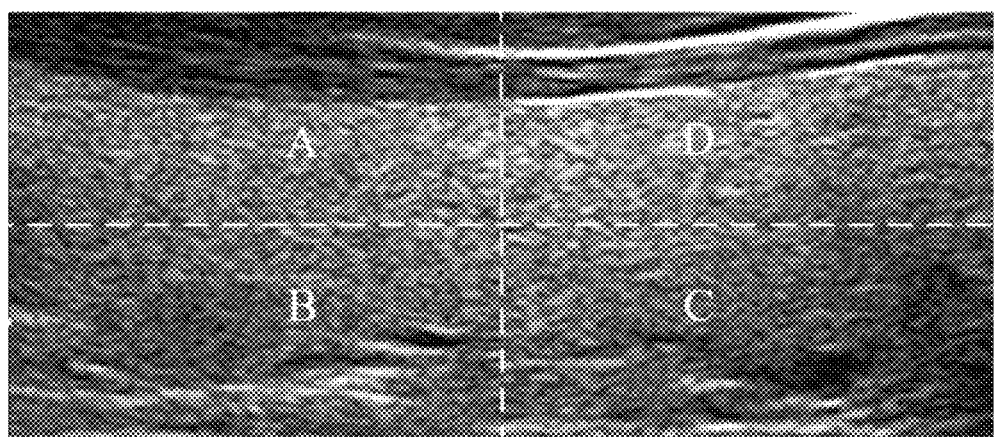
FIG. 7 illustrates a schematic diagram of a thyroid ultrasonic longitudinal scanned image and the division of subregions in the embodiment of the present invention.

Further, in response to the contour point p being in the non-target edge region, it is further determined whether the contour point p is in a foreground region or a background region; and since the characteristics of a surrounding region of a contour point are similar to those of a region in which the contour point is located, the fuzzy boundary image is divided into several subregions according to image characteristics, and then, for these subregions, it is determined whether the contour point p is in the foreground region or the background region. In this embodiment, thyroid ultrasonic images are used as test images. The thyroid ultrasonic images are classified into a transverse scanned image and a longitudinal scanned image, as shown in FIGS. 6 and 7. The left and right segmentation line in FIG. 6 separates the bronchial and carotid regions, and the upper and lower segmentation line reduces the effect of acoustic attenuation, where the pixel intensity in part of the thyroid ultrasonic image decreases with depth and the upper part is generally brighter than 1R the lower part, while dividing the muscle region. The upper and lower segmentation line in FIG. 7 similarly reduces the effect of acoustic attenuation while dividing the muscle region. In these subregions, for the subregions A, B, C, and D, it is determined whether the contour point p is in the foreground region or the background region, and the specific steps are as follows:

in S2.3.5, firstly, the fuzzy boundary image is divided into several subregions according to image characteristics, and a subregion $O \in \{A, B, C, D\}$ in which the contour fragment $\Delta C$ is located is determined;

in S23.6, a two-dimensional coordinate system is established in the image subregion O with the coordinate position of a contour point in the middle of the contour fragment $\Delta C$ as the center point center($x_0, y_0$), thus obtaining a two-dimensional Gaussian function $$f(x,y) = \exp\left(-\left(\frac{(x-x_0)^2}{2\sigma_x^2} + \frac{(y-y_0)^2}{2\sigma_y^2}\right)\right),$$

with ⅙ of the maximum distance of $x_0$ from a boundary of the subregion as the standard deviation a, of the X-axis portion of the Gaussian function, and with ⅙ of the maximum distance of y, from the boundary of the subregion as the standard deviation $\sigma_y$ of the Y-axis portion of the Gaussian function; and a weight IV, is assigned to each point in the subregion using the two-dimensional Gaussian function and weights W, for the inside and outside of the contour are normalized, respectively, to obtain normalized weights $w_{ij\_in}$ for the inside of the contour and normalized weights $w_{ij\_out}$ for the outside of the contour;

in S2.3.7, averages $c_{o1}$ and $c_{o2}$ for the inside and outside of the contour in the subregion O are calculated using the normalized weights $w_{ij\_in}$ and $w_{ij\_out}$ and a pixel intensity $\mu_0(i,j)$, where when the point (i,j) is inside the contour in the subregion O, $$c_{o1} = \frac{\sum w_{ij\_in} \cdot \mu_0(i,j)}{N},$$

N being the number of points inside the contour in the subregion O; and when the point (I,j) is outside the contour in the subregion O, $$c_{o2} = \frac{\sum w_{ij\_out} \cdot \mu_0(i,j)}{M},$$

M being the number of points outside the contour in the subregion O; and in S2.3.8, a pixel intensity average mA of surrounding regions of all contour points in the contour fragment $\Delta C$ is calculated, and the differences between $m_{\Delta c}$ and $c_{o1}$ and $c_{o2}$ are compared, where if $mA|m_{\Delta c} - c_{o1}| \leq |m_{\Delta c} - c_{o2}|$ the contour points in the contour fragment $\Delta C$ are in the foreground region, and otherwise the contour points are in the background region; and if the contour point p is in the foreground region, the direction of evolution of the contour point p is towards the outside of the contour, wherein in the energy function, the correction of the direction of evolution is embodied in increasing the energy of the outside of the contour in a local region of the foreground contour point, with the increased energy being defined as:

$$\sum_{p \in F(C)} \int_{a(p)} |\mu_0(x,y) - c_{op} + c_2|(1 - H(\phi(x,y)))dxdy;$$

and if the contour point p is in the background region, the direction of evolution of the contour point p is towards the inside of the contour, wherein in the energy function, the correction of the direction of evolution is embodied in increasing the energy of the inside of the contour in a local region of the background contour point, with the increased energy being defined as:

$$\sum_{p \in B(C)} \int_{a(p)} |\mu_0(x,y) - c_{ip} + c_1|H(\phi(x,y))dxdy.$$

In S2.4, after determining a region in which each contour point is located, a value of the partial differential equation is calculated, and a contour is evolved through iterations of $$\phi^{n+1} = \phi^n + \Delta t \frac{\partial \phi}{\partial t}$$

until a maximum number of iterations iter 1000 is reached or the contour changes slightly or does not change, and then the segmentation is completed, where a contour change $$\Delta h = \sum_{i,j}(|H(\phi_{i,j}^{n+1}) - H(\phi_{i,j}^n)|),$$

which indicates changing of the contour, and the iteration stops in response to a plurality of successive slight changes of the contour.

Figure 2:
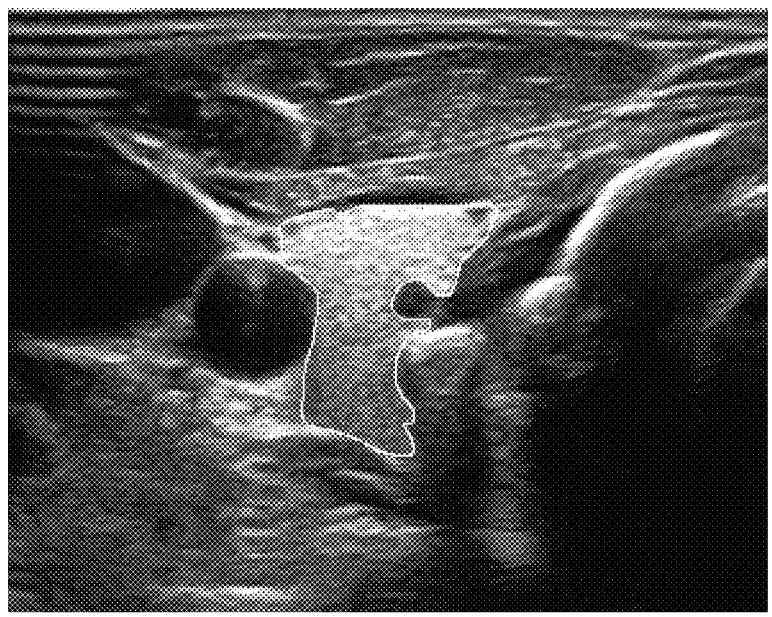
FIG. 2 illustrates a middle boundary label image of the embodiment of the present invention, where the white line indicates the schematic diagram of a thyroid region.
Figure 4:
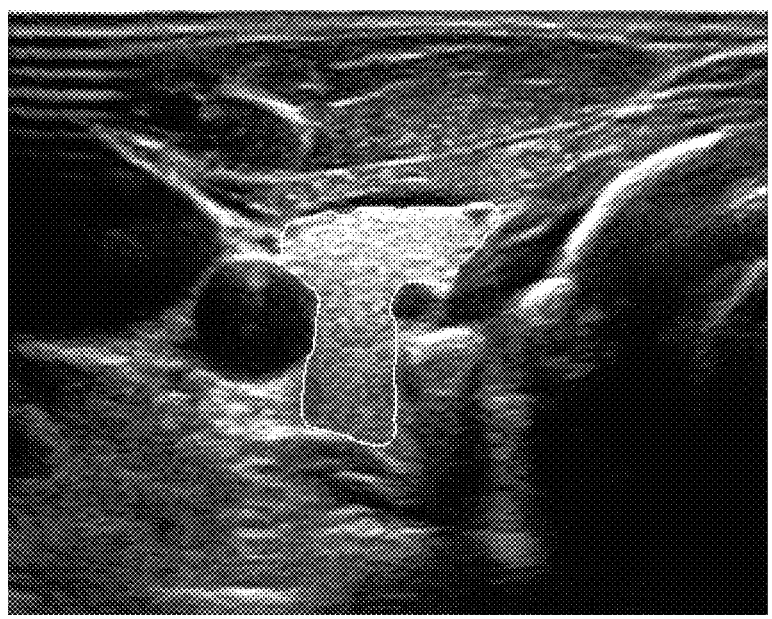
FIG. 4 illustrates a schematic diagram of the result of segmenting the thyroid region based on a deep model U-Net and an active contour model in the embodiment of the present invention.

In this embodiment, FIG. 2 illustrates a standard segmented image, labeled by an experienced doctor. The segmentation result of U-Net in FIG. 3 presents problems of segmentation errors and under-segmentation. However, after using the active contour model, as shown in FIG. 4, regions with segmentation errors are removed from the result image and the contour is enabled to expand outward in the fuzzy region to cover part of the under-segmented region.

The purpose of the method for automatic segmentation of a fuzzy boundary image based on active contour and deep learning is to enable the segmentation model to segment fuzzy boundary regions while fine-tuning the segmentation contour so that the segmentation contour is as close to the target boundary as possible. The present invention adopts a combination of a deep convolutional network model and an active contour model to enable the model to achieve accurate segmentation results. The experimental data of the present invention are thyroid ultrasonic images, and the data set contains 309 images, of which 150 are used as the training set and the remaining 159 are used as the test set. The U-Net model is trained using the 150 training images, and the trained model segments the 159 test images, and then the U-Net segmentation results are further fine-tuned using the active contour model. The quantitative indexes of the segmentation results are as follows:

$$\text{Accuracy} = \frac{TP + TN}{A_P + A_N},$$

$$PPV = \frac{TP}{TP + FP}, \text{ and}$$

$$IoU = \frac{TP}{FN + TP + FP}$$

where TP, TN, FP, FN, $A_p$, and $A_N$ denote True Positive, True Negative, False Positive, False Negative, All Positive, and All Negative, respectively. The average quantitative indexes obtained after segmentation of the 159 images are as shown in Table 1.

TABLE 1

| Quantitative index | Accuracy | PPV | IOU |
| --- | --- | --- | --- |
| U-Net | 0.9922 | 0.9090 | 0.8872 |
| The present invention | 0.9933 | 0.9278 | 0.9026 |

As can be seen from the above table, the present invention combines the U-Net model and the active contour model, and achieves a higher accuracy of pixel classification in terms of fine-grained segmentation compared to the approach in which only the U-Net model is used, where Accuracy reaches 0.9933; 0.9278 of the region segmented as the thyroid is the correct thyroid region, with an improvement of 2.78% in accuracy; and the intersection over union of the region that is divided as the thyroid versus the true thyroid region is 0.9026, with an improvement of 1.54% compared to the approach in which only the U-Net model is used. The improvements of the present invention regarding the quantitative indexes Accuracy, PPV, and IOU indicate that the present invention can further improve the accuracy of target segmentation in fuzzy images and can yield fine and accurate segmentation results for fuzzy boundaries. In the present invention, the use of an active contour model based on U-Net leads to better fuzzy boundary image segmentation results. The method for automatic segmentation of a fuzzy boundary image based on active contour and deep learning has the capability of segmenting a fuzzy boundary in a fuzzy boundary image while fine-tuning the segmentation contour to cause the contour to move close to the target boundary.

What is claimed is:

1. A method for automatic segmentation of a fuzzy boundary image based on active contour and deep learning, comprising the following steps:
   S0, generate a medical image by an ultrasound system, wherein the medical image is a fuzzy boundary image;
   S1, segmenting the fuzzy boundary image using a deep learning model to obtain an initialized target segmentation result; and
   S2, fine-tuning the segmentation result of the model using an active contour model to obtain a more accurate normal boundary and fuzzy boundary segmentation result, the step specifically comprising:
   S2.1, initializing the active contour model using a region boundary in the initialized target segmentation result obtained in S1 to construct an initial level set, wherein the initial level set $\phi_I(x, y)$ of the active contour model is constructed from the segmentation result of the deep learning model, and the initial level set is defined as follows:

$$\phi_I(x, y) = \begin{cases} D(x, y), R(x, y) = 0 \\ -D(x, y), R(x, y) = 1 \end{cases}$$

where $R(x, y)=\{0,1\}$ is the segmentation result of the deep learning model, $R(x, y)=0$ indicates that a point $(x, y)$ belongs to a target region, and $R(x, y)=1$ indicates that the point $(x, y)$ belongs to a non-target region; and points at a demarcation between the target region and the non-target region form a target boundary B, and $D(x, y)$ is the shortest distance between each point $(x, y)$ on the image and the target boundary B;
   S2.2, using the level set to represent an energy function, and obtaining a partial differential equation for curve evolution through the energy function;
   S2.3, performing a judgment of a region in which a contour point is located; and
   S2.4, after determining a region in which each contour point is located, calculating a value of the partial differential equation and evolving a contour through iterations until a maximum number of iterations is reached or the contour changes slightly or does not change, and then completing the segmentation.

2. The method for automatic segmentation of a fuzzy boundary image based on active contour and deep learning of claim 1, wherein in step S2.2, a total of three parts are included in the energy function: 1) the perimeter and area of the contour; 2) a contour local region energy; and 3) a contour constraint energy; and
   the whole energy function is defined as follows:

$$F = u \cdot \text{Length}(C) + v \cdot \text{Area}(\text{inside}(C)) + \lambda_1 \left( \sum_{p \in B(C)} \int_{ia(p)} |\mu_0(x, y) - c_{ip}|^2 dxdy + \sum_{p \in B(C)} \int_{ia(p)} |\mu_0(x, y) - c_{ip} + c_1| dxdy \right) + \lambda_2 \left( \sum_{p \in N(C)} \int_{oa(p)} |\mu_0(x, y) - c_{op}|^2 dxdy + \sum_{p \in F(C)} \int_{oa(p)} |\mu_0(x, y) - c_{op} + c_2| dxdy \right) + \frac{\lambda_3}{2}(C - C_0)^2$$

where C denotes a current segmentation contour, $C_0$ denotes an initialized segmentation contour, Length(C) denotes the perimeter of the contour C, Area(inside(C)) denotes the area of a region inside the contour C, $\mu_0(x,y)$ is a pixel intensity of a source image I at $(x,y)$, $c_1$ is a pixel intensity average inside the contour C, $c_2$ is a pixel intensity average outside the contour C, p is a point on the contour C, $p \in N(C)$ indicates that the contour point p is in a target edge region, $p \in F(C)$ indicates that the contour point p is in a foreground (target) region, $p \in B(C)$ indicates that the contour point p is in a background region, $ia(p)$ is a point that is in the surrounding of the contour point p and inside the contour C, $oa(p)$ is a point that is in the surrounding of the contour point p and outside the contour C, $c_{ip}$ is a pixel intensity average of points that satisfy $ia(p)$, $c_{op}$, is a pixel intensity average of points that satisfy $oa(p)$, the surrounding of the contour point p refers to being in the range of a circle with P as the center and R as the radius; and a first term and a second term in the energy function denote the perimeter and area of the contour and serve to keep the contour continuous and smooth and are related only to the size and shape of the contour itself; a third term and a fourth term in the energy function denote a contour local region energy and serve to cause the contour to evolve towards a target boundary and is related to image data; and a fifth term in the energy function denotes a contour constraint energy and serves to limit the evolution of a current contour towards a region that greatly deviates from the initialized contour, and u, v, $\lambda_1$, $\lambda_2$, $\lambda_3$ are coefficients of the corresponding energy terms.

3. The method for automatic segmentation of a fuzzy boundary image based on active contour and deep learning of claim 2, wherein in the energy function F, a level set method is used to denote the contour C as well as the inside and outside of the contour; and in the level set method, the contour C in an image domain $\Omega$ is denoted as a zero level set, i.e., $\phi=0$, which is defined as follows:

$$\begin{cases} C = \{(x, y) \in \Omega : \phi(x, y) = 0\} \\ \text{inside}(C) = \{(x, y) \in \Omega : \phi(x, y) > 0\} \\ \text{outside}(C) = \{(x, y) \in \Omega : \phi(x, y) < 0\} \end{cases}$$

the zero level set, i.e., $\phi=0$, is used to denote the contour C;

a Heaviside function H and a Dirac function $\delta_0$ are defined as follows:

$$H(z) = \begin{cases} 1, & \text{if } z \geq 0 \\ 0 & \text{if } z < 0 \end{cases}, \delta_0(z) = \frac{d}{dz}H(z);$$

H is used to denote the inside and outside of the contour C:

$$\begin{cases} \text{inside } (C) = H(\phi(x, y)) = 1 \\ \text{outside } (C) = H(\phi(x, y)) = 0 \end{cases};$$

the level set $\phi$, the function H, and the function $\delta_0$ are used to denote the perimeter and area of the contour:

$$\text{Length } \{\phi = 0\} = \int_\Omega |\nabla H(\phi(x, y))| dxdy = \int_\Omega \delta_0(\phi(x, y)|\nabla \phi(x, y)| dxdy; \text{ and}$$

$$\text{Area } \{\phi > 0\} = \int_\Omega H(\phi(x, y)) dxdy;$$

the contour constraint energy is the difference between the current contour C and the initialized contour $C_0$, and is denoted using the level set $\phi$, the function H, and $\phi_1$, and the contour constraint energy is denoted as the difference between the current level set $\phi$ and the initialized level set $\phi_1$:

$$(C-C_0)^2 = \int_\Omega (H(\phi(x,y))) - H(\phi_1(x,y)))^2 dxdy;$$

the contour local region energy is the sum of energies inside and outside the surrounding of all contour points; an energy of surrounding regions of the contour is calculated by calculating, separately for each contour point, energies inside and outside the contour in a local region of the contour point using a local calculation method and then superimposing the energies to obtain an overall energy; and after being denoted using the level set $\phi$ and the function H, terms in the energy of the surrounding regions of the contour are defined as follows:

$$\sum_{p \in N(C)} \int_{ia(p)} |\mu_0(x, y) - c_{ip}|^2 dxdy =$$

$$\sum_{p \in N(C)} \int_{a(p)} |\mu_0(x, y) - c_{ip}|^2 H(\phi(x, y)) dxdy;$$

$$\sum_{p \in B(C)} \int_{ia(p)} |\mu_0(x, y) - c_{ip} + c_1| dxdy =$$

$$\sum_{p \in B(C)} \int_{a(p)} |\mu_0(x, y) - c_{ip} + c_1| H(\phi(x, y)) dxdy;$$

$$\sum_{p \in N(C)} \int_{oa(p)} |\mu_0(x, y) - c_{op}|^2 dxdy =$$

$$\sum_{p \in N(C)} \int_{a(p)} |\mu_0(x, y) - c_{op}|^2 (1 - H(\phi(x, y))) dxdy; \text{ and}$$

$$\sum_{p \in F(C)} \int_{oa(p)} |\mu_0(x, y) - c_{op} + c_2| dxdy =$$

$$\sum_{p \in F(C)} \int_{a(p)} |\mu_0(x, y) - c_{op} + c_2|(1 - H(\phi(x, y))) dxdy$$

where for a point $p(x_p, y_p)$ on the contour point C, $\phi(p)=0$; $a(p)$ denotes a point that is in the surrounding of the contour point p, the surrounding of the contour point p referring to being in the range of a circle with P as the center and R as the radius; $ia(p)$ denotes a point that is in the surrounding of the contour point p and inside the contour C, and for a point $a(x_a, y_a)$ satisfying $ia(p)$, $\phi(x_a, y_a)>0$ and $\sqrt{(x_a-x_p)^2+(y_a-y_p)^2} \leq R$; and $oa(p)$ denotes a point that is in the surrounding of the contour point p and outside the contour C, and for a point $a(x_a, y_a)$ satisfying $oa(p)$, $\phi(x_a, y_a)<0$ and $\sqrt{(x_a-x_p)^2+(y_a-y_p)^2} \leq R$.

4. The method for automatic segmentation of a fuzzy boundary image based on active contour and deep learning of claim 2, wherein after denoting the energy terms using the level set method, the energy function F is defined as:

$$F = \mu \int_\Omega \delta_0(\phi(x, y))|\nabla \phi(x, y)| dxdy +$$

$$v \int_\Omega H(\phi(x, y)) dxdy + \lambda_1 \left( \sum_{p \in N(C)} \int_{a(p)} |\mu_0(x, y) - c_{ip}|^2 H(\phi(x, y)) dxdy + \right.$$

$$\sum_{p \in B(C)} \int_{a(p)} |\mu_0(x, y) - c_{ip} + c_1| H(\phi(x, y)) dxdy +$$

$$\lambda_2 \left( \sum_{p \in N(C)} \int_{a(p)} |\mu_0(x, y) - c_{op}|^2 (1 - H(\phi(x, y))) dxdy + \right.$$

$$\sum_{p \in F(C)} \int_{a(p)} |\mu_0(x, y) - c_{op} + c_2|(1 - H(\phi(x, y))) dxdy +$$

$$\frac{\lambda_3}{2} \int_\Omega (H(\phi(x, y))) - H(\phi_I(x, y)))^2 dxdy$$

where $c_1$ is the pixel intensity average inside the contour C, and $c_2$ is the pixel intensity average outside the contour $c_{ip}$ which satisfy, respectively:

$c_1(\phi)$=average $(u_0)$ in $\{\phi \geq 0\}$, $c_2(\phi)$=average $(u_0)$ in $\{\phi < 0\}$; and $c_1$ and $c_2$ are defined through the level set as follows:

$$c_1 = \frac{\int_\Omega u_0(x, y) H(\phi(x, y)) dxdy}{\int_\Omega H(\phi(x, y)) dxdy}; \text{ and}$$

$$c_2 = \frac{\int_\Omega u_0(x, y)(1 - H(\phi(x, y))) dxdy}{\int_\Omega (1 - H(\phi(x, y))) dxdy}$$

where $c_{ip}$ is a pixel intensity average of points satisfying $ia(p)$ and $c_{op}$ is a pixel intensity average of points satisfying $oa(p)$; and $c_{ip}(\phi)$=average$(\mu_0)$ in $\{a(p)$ and $\varphi \geq 0\}$ and $c_{op}(\phi)$=average$(\mu_0)$ in $\{a(p)$ and $\varphi < 0\}$ are defined as follows:

$$c_{ip} = \frac{\int_{a(p)} u_0(x, y) H(\phi(x, y)) dx dy}{\int_{a(p)} H(\phi(x, y)) dx dy}; \text{ and}$$

$$c_{op} = \frac{\int_{a(p)} u_0(x, y)(1 - H(\phi(x, y))) dx dy}{\int_{a(p)} (1 - H(\phi(x, y))) dx dy};$$

and a partial differential equation for curve evolution is obtained from the energy function F by means of a Euler-Lagrange variational method and a gradient descent flow as follows:

$$\frac{\partial \phi}{\partial t} = \delta_\varepsilon \Bigg[ u\, div\left(\frac{\nabla \phi}{|\nabla \phi|}\right) - v -$$

$$\lambda_1 \Bigg( \sum_{p \in N(C), (x,y) \in a(p)} (u_0(x, y) - c_{ip})^2 - \sum_{p \in B(C), (x,y) \in a(p)} (u_0(x, y) - c_{ip} + c_1)^2 \Bigg) +$$

$$\lambda_2 \Bigg( \sum_{p \in N(C), (x,y) \in a(p)} (u_0(x, y) - c_{ip})^2 - \sum_{p \in F(C), (x,y) \in a(p)} (u_0(x, y) - c_{ip} + c_2)^2 \Bigg) +$$

$$\lambda_3 (H_\varepsilon(\phi) - H_\varepsilon(\phi_I)) \Bigg],$$

where $$H_\varepsilon(z) = \frac{1}{2}\left(1 + \frac{2}{\pi}\arctan\left(\frac{z}{\varepsilon}\right)\right), \quad \delta_\varepsilon(z) = \frac{\varepsilon}{\pi(\varepsilon^2 + z^2)},$$

and $(x,y) \in a(p)$ indicates that the point $(x,y)$ is in the surrounding of the contour point p, the surrounding of the contour point p referring to being in the range of a circle with p as the center and R as the radius; and in the process of curve evolution, the level set of the nth iteration is $\phi^n$ and the level set of the (n+1)th iteration is $$\phi^{n+1} = \phi^n + \Delta t \frac{\partial \phi}{\partial t},$$

and partial derivatives in the horizontal direction and the vertical direction of a two-dimensional image are calculated using a finite difference approach.

5. The method for automatic segmentation of a fuzzy boundary image based on active contour and deep learning of claim 1, wherein in step S2.3, it is judged whether the contour point p is in a target edge region or a non-target edge region by the difference between pixel intensities inside and outside the contour, and the specific method is as follows: in the fuzzy boundary image, the difference between the pixel intensity averages inside and outside the surrounding of the contour is larger in the target edge region, while the difference between the pixel intensity averages inside and outside the surrounding of the contour is smaller in the non-target edge region; and when the contour point p is in the non-target edge region, the values of $c_{ip}$ and $c_{op}$ are close to each other, i.e., $c_{ip} \approx c_{op}$, $|c_{ip} - c_{op}| \leq c_d$, $c_d$ being a threshold for judging whether $c_{ip}$ is close to $c_{op}$, and the judgment is performed through the following steps:

S2.3.1, calculating the difference $d_p$ between $c_{ip}$ and $c_{op}$ for each contour point on the contour in counterclockwise order, and constructing a closed-loop queue D in an order obtained through $d_p$;

S2.3.2, smoothing the closed-loop queue D using a Gaussian filter of width R;

S2.3.3, searching for a fragment $\Delta C$ that is longer than 2R and satisfies $d_p \leq c_d$ in the closed-loop queue D; and S2.3.4, if there exists a fragment satisfying step S2.33, all contour points in the fragment are in the non-target edge region and the other contour points are in the target edge region; and the sum of energies inside the contour in local regions of contour points in the target edge region is as follows:

$$\sum_{p \in N(C)} \int_{a(p)} |\mu_0(x, y) - c_{ip}|^2 H(\phi(x, y)) dx dy;$$

and the sum of energies outside the contour in local regions of contour points in the target edge region is as follows:

$$\sum_{p \in N(C)} \int_{a(p)} |\mu_0(x, y) - c_{op}|^2 (1 - H(\phi(x, y))) dx dy.$$

6. The method for automatic segmentation of a fuzzy boundary image based on active contour and deep learning of claim 5, wherein in response to the contour point p being in the non-target edge region, it is further determined whether the contour point p is in a foreground region or a background region; and since the characteristics of a surrounding region of a contour point are similar to those of a region in which the contour point is located, the fuzzy boundary image is divided into several subregions according to image characteristics, and then, for these subregions, it is determined whether the contour point p is in the foreground region or the background region, and the specific method is as follows:

S2.3.5, firstly, dividing the fuzzy boundary image into several subregions according to image characteristics, and determining a subregion O in which the contour fragment $\Delta C$ is located;

S2.3.6, establishing a two-dimensional coordinate system in the image subregion O with the coordinate position of a contour point in the middle of the contour fragment $\Delta C$ as the center point center $(x_0, y_0)$ of a two-dimensional Gaussian function $f(x,y)$, with ⅙ of the maximum distance of $x_0$ from a boundary of the subregion as the standard deviation $\sigma_x$ as of the X-axis portion of the Gaussian function, and with ⅙ of the maximum distance of $y_0$ from the boundary of the subregion as the standard deviation $\sigma_y$ of the Y-axis portion of the Gaussian function; and assigning a weight $w_{ij}$ to each point in the subregion using the two-dimensional Gaussian function and normalizing weights $w_{ij}$ for the inside and outside of the contour, respectively, to obtain normalized weights $w_{ij\_in}$ for the inside of the contour and normalized weights $w_{ij\_out}$ for the outside of the contour;

S2.3.7, calculating averages $c_{o1}$ and $c_{o2}$ for the inside and outside of the contour in the subregion O using the normalized weights $w_{ij\_in}$ and $w_{ij\_out}$ and a pixel intensity $\mu_0(i,j)$, wherein when the point $(i,j)$ is inside the contour in the subregion O, $$c_{o1} = \frac{\sum w_{ij\_in} \cdot \mu_0(i,j)}{N},$$

N being the number of points inside the contour in the subregion O; and when the point $(i,j)$ is outside the contour in the subregion O, $$c_{o2} = \frac{\sum w_{ij\_out} \cdot \mu_0(i,j)}{M},$$

M being the number of points outside the contour in the subregion O; and

S2.3.8, calculating a pixel intensity average $m_{\Delta c}$, of surrounding regions of all contour points in the contour fragment $\Delta C$, and comparing the differences between $m_{\Delta c}$ and $c_{o1}$ and $c_{o2}$, wherein if $|m_{\Delta c} - c_{o1}| \leq |m_{\Delta c} - c_{o2}|$, the contour points in the contour fragment $\Delta C$ are in the foreground region, and otherwise in the background region.

7. The method for automatic segmentation of a fuzzy boundary image based on active contour and deep learning of claim 6, wherein if the contour point p is in the foreground region, the direction of evolution of the contour point p is towards the outside of the contour, wherein in the energy function, the correction of the direction of evolution is embodied in increasing the energy of the outside of the contour in a local region of the foreground contour point, with the increased energy being defined as:

$$\sum_{p \in F(C)} \int_{a(p)} |\mu_0(x, y) - c_{op} + c_2|(1 - H(\phi(x, y)))dxdy;$$

and if the contour point p is in the background region, the direction of evolution of the contour point p is towards the inside of the contour, wherein in the energy function, the correction of the direction of evolution is embodied in increasing the energy of the inside of the contour in a local region of the background contour point, with the increased energy being defined as:

$$\sum_{p \in B(C)} \int_{a(p)} |\mu_0(x, y) - c_{ip} + c_1| H(\phi(x, y))dxdy).$$

8. The method for automatic segmentation of a fuzzy boundary image based on active contour and deep learning of claim 1, wherein in step S2.4, the contour is evolved through iterations of $$\phi^{n+1} = \phi^n + \Delta t \frac{\partial \phi}{\partial t}$$

until a maximum number of iterations iter is reached or the contour changes slightly or does not change, where $200 \leq iter \leq 10000$; and a contour change $$\Delta h = \sum_{i,j} (|H(\phi_{i,j}^{n+1}) - H(\phi_{i,j}^n)|),$$

which indicates changing of the contour, and the iteration stops in response to a plurality of successive slight changes of the contour.

\* \* \* \* \*